United States Patent
Sarkar et al.

(10) Patent No.: US 12,146,985 B2
(45) Date of Patent: Nov. 19, 2024

(54) METHODS AND SYSTEMS FOR LOW-POWER EYE TRACKING

(71) Applicant: AdHawk Microsystems Inc., Waterloo (CA)

(72) Inventors: Niladri Sarkar, Waterloo (CA); Nino Zahirovic, Waterloo (CA)

(73) Assignee: AdHawk Microsystems Inc., Waterloo (CA)

( * ) Notice: Subject to any disclaimer, the term of this patent is extended or adjusted under 35 U.S.C. 154(b) by 0 days.

(21) Appl. No.: 18/201,950

(22) Filed: May 25, 2023

(65) Prior Publication Data
US 2023/0384427 A1 Nov. 30, 2023

Related U.S. Application Data

(60) Provisional application No. 63/345,729, filed on May 25, 2022.

(51) Int. Cl.
*G06F 3/01* (2006.01)
*G01S 7/481* (2006.01)
*G01S 17/88* (2006.01)

(52) U.S. Cl.
CPC .......... *G01S 7/4816* (2013.01); *G01S 7/4817* (2013.01); *G01S 17/88* (2013.01); *G06F 3/013* (2013.01)

(58) Field of Classification Search
CPC ............................ G02B 27/0093; G06F 3/013
See application file for complete search history.

(56) References Cited

U.S. PATENT DOCUMENTS

| | | | |
|---|---|---|---|
| 8,402,561 B2 | 3/2013 | Sarkar | |
| 9,267,962 B2 | 2/2016 | Sarkar et al. | |
| 10,213,105 B2 | 2/2019 | Sarkar | |
| 10,824,229 B2 | 11/2020 | Sarkar | |
| 2002/0014579 A1 | 2/2002 | Dunfield | |
| 2015/0047078 A1 | 2/2015 | Sarkar et al. | |
| 2016/0166146 A1 | 6/2016 | Sarkar | |
| 2017/0115483 A1 | 4/2017 | Aleem et al. | |
| 2018/0210547 A1 | 7/2018 | Sarkar | |
| 2019/0204913 A1 | 7/2019 | Sarkar et al. | |
| 2021/0081041 A1 | 3/2021 | Sarkar | |
| 2021/0106219 A1* | 4/2021 | Gibson | G02B 26/101 |
| 2021/0124416 A1 | 4/2021 | Sarkar et al. | |

* cited by examiner

*Primary Examiner* — Thanh Luu
(74) *Attorney, Agent, or Firm* — Kaplan Breyer Schwarz, LLP (57) ABSTRACT

Systems and methods for performing eye tracking using a scanning light signal with low power consumption are disclosed herein. Power consumption is reduced by intelligent disabling and re-enabling of non-imaging photodetector(s) and/or light source(s). In one embodiment, the scan region is contracted to a single feature of the eye (e.g., the pupil, a glint, etc.) in view of a particular type of event of interest to detect.

22 Claims, 6 Drawing Sheets

METHODS AND SYSTEMS FOR LOW-POWER EYE TRACKING

CROSS REFERENCE TO RELATED APPLICATIONS

This application claims priority to, and incorporates fully by reference, U.S. Provisional Application Ser. No. 63/345,729, filed May 25, 2022, entitled "Methods and Systems for Low-Power Eye Tracking,". If there are any contradictions or inconsistencies in language between this application and one or more of the cases that have been incorporated by reference that might affect the interpretation of the claims in this case, the claims in this case should be interpreted to be consistent with the language in this case.

FIELD OF THE INVENTION

The present invention relates to object-tracking systems, such as eye-tracking systems and the like.

BACKGROUND

The movement of the human eye can reveal a wealth of information about the neural mechanisms of the brain and vision, as well as an individual's neurological health, ocular health, interests, and state-of-mind. In addition, the tracking of eye movement can be used to improve/augment human-computer interaction, enable gaze-based man-machine interfaces, and enhance how we interact with wearable technology. For example, gaze tracking, which relies on eye tracking, enables many augmentative alternative communication (AAC) devices that improve the ability for individuals lacking speech capability and/or motor skills (e.g., amyotrophic lateral sclerosis (ALS) patients or those with spinal cord injuries) to interact with the world around them.

Unfortunately, conventional eye-trackers are typically imaging systems that are slow, bulky, invasive, and/or restrictive for the user. This makes them difficult, if not impossible to use in many of the applications discussed above. In addition, conventional systems generally require cameras and imaging processing software. As a result, such eye-tracking systems tend to be expensive, slow, and power hungry.

More recently, improved eye-tracking systems have been developed in which a light signal is scanned in a two-dimensional pattern over an eye and eye position is determined from one or more reflections of the light signal from the eye. These scanning-light-signal systems are significantly faster than conventional imaging systems and also consume much less power. Their power consumption can still be significant, however, when applied to lightweight wearables with significantly constrained battery capacity. For battery-based portable eye-trackers, this can limit battery life and/or give rise to a need for larger, heavier charge storage systems that can increase user discomfort.

The ability to track the instantaneous position and orientation of an object, such as an eye, with reduced power consumption would be a welcome advance in the state of the art.

SUMMARY

The present disclosure is directed toward scanning-beam eye-tracking systems having reduced power consumption. Embodiments in accordance with the present disclosure are particularly well suited for use in portable systems, such as augmented-reality and virtual-reality systems.

Like the prior art, eye-tracking systems in accordance with the present disclosure scan a light signal over a scan region of an eye in a two-dimensional pattern and detect reflections from the scan region via one or more photodetectors. The timing and/or intensity of the reflection(s) is used to estimate the gaze direction of the eye.

An advance over the prior art is realized by disabling light source(s) and/or photodetector(s) at various times, thereby reducing power consumption. In one embodiment, these elements may be disabled during scanning of portions of the scan region that are less likely to contain a feature of interest (e.g., the pupil, a glint, etc.), such as peripheral portion(s) of the scan region. Embodiments of the present disclosure are capable of further reducing power consumption by monitoring only a single feature. In one implementation, a single feature to monitor is selected, and the scan region is then contracted to an "active" subregion containing the single feature and no other features. Light source(s) and/or photodetector(s) may then be disabled during scanning of inactive portions of the scan region (i.e., portions other than the active subregion). It should be noted that in some embodiments, disabling an element might maintain a portion of the power that is supplied while the element is enabled (e.g., in order to maintain bias points for analog front ends [AFEs] and drive circuits, etc.), while in some other embodiments, disabling an element might shut down power completely.

DETAILED DESCRIPTION

Figure 1:
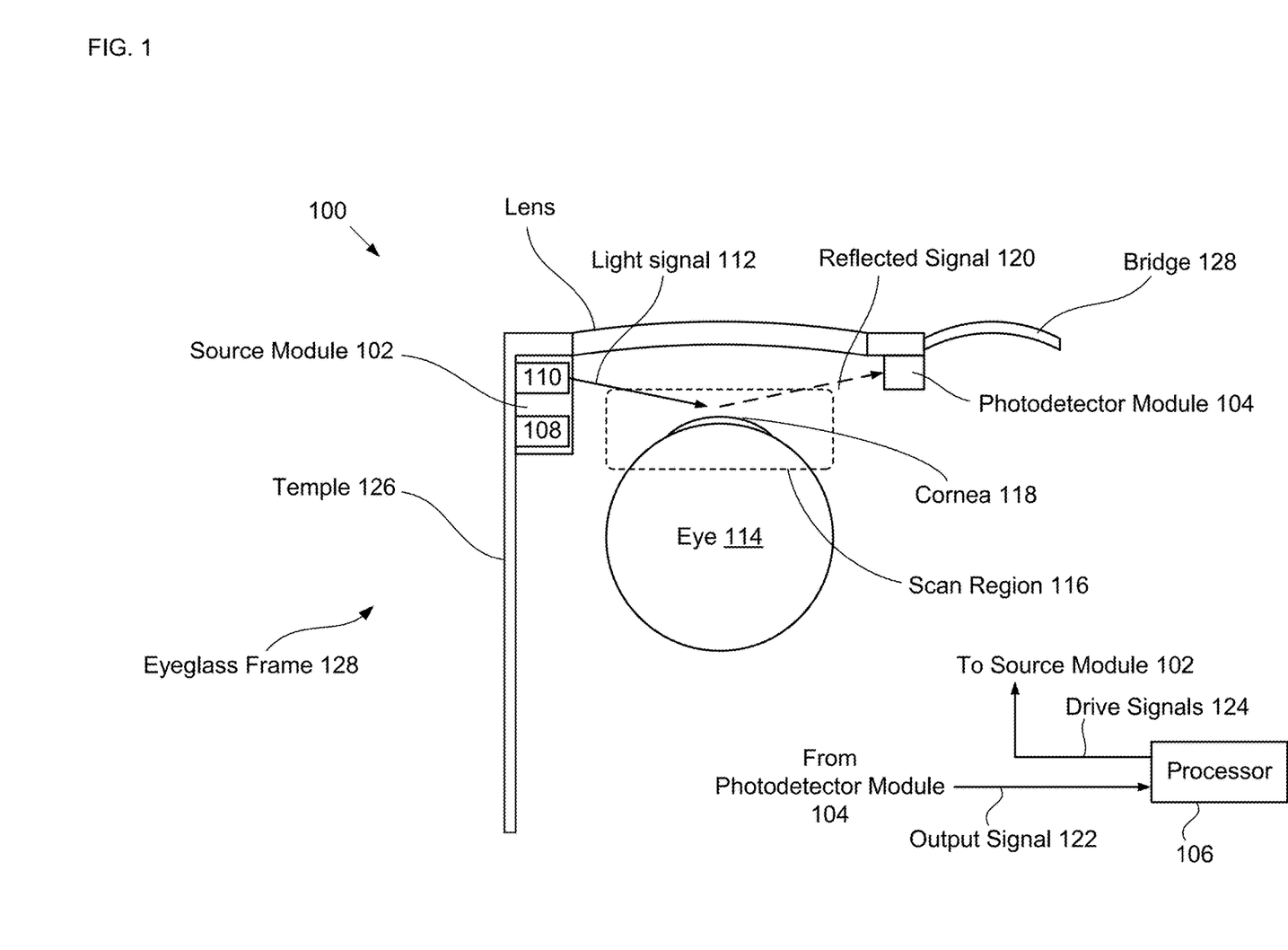
FIG. 1 depicts a schematic block diagram illustrating an eye-tracking system according to aspects of the present disclosure.

FIG. 1 depicts a schematic block diagram illustrating an eye-tracking system according to aspects of the present disclosure. As will be apparent to those skilled in the art by inspection of this figure, such illustrative systems constructed according to aspects of the present disclosure exhibit substantial improvements in size, cost, power consumption, bandwidth and precision as compared with prior art eye-tracking systems.

In the depicted example, eye-tracking system 100 includes source module 102, photodetector module 104, and processor 106, among other elements (e.g., memory, power module, etc.).

Source module 102 includes light source 108 and scanner 110, which collectively direct light signal 112 toward scan region 116 on eye 114.

Light source 108 is a conventional light source configured for providing a suitable light signal to scanner 110. In the depicted example, light source 108 provides a light signal having approximately 1 mW of optical power at 940 nm. The light signal has a Full-Width-at-Half-Maximum (FWHM) divergence of approximately 20 degrees, which is collimated and redirected toward scanner 110 such that the light signal has a smaller divergence (preferably less than about 1-2 degrees). It should be noted, however, that light source 108 can be any of any variety known in the art without departing from the scope of the present disclosure. It should further be noted that some embodiments of eye-tracking system 100 might comprise a plurality of light sources 108 or Source Modules 102 (e.g., for redundancy/fault-tolerance, etc.). For convenience, FIG. 1 depicts a single light source 108 in a single Source Module 102.

Scanner 110 is a two-axis resonant scanning mirror that is configured to receive the light signal and provide light signal 112, which the scanner scans in a two-dimensional scan pattern over scan region 116. In the depicted example, scan region 116 is a portion of eye 114 that contains cornea 118. In some embodiments, a scan region includes a different surface feature of the eye.

Scanner 110 includes first and second rotation axes, each of which is characterized by a resonant frequency, and each of which is driven with a periodic signal whose drive frequency is close to the resonant frequency of its respective axis. Emphasizing simple design principles according to the present disclosure, scanner 110 is preferably a two-axis, resonant micro-electromechanical systems (MEMS) device having two orthogonal rotation axes. Non-limiting examples of scanners suitable for use in accordance with the present disclosure are described in detail in, for example, U.S. Pat. Pub. Nos. 2018/0210547, 2015/0047078, 2016/0166146, and 2019/0204913, as well as in U.S. Pat. Nos. 8,402,561, 9,267,962, 10,213,105, and 10,824,229, each of which is incorporated herein by reference.

Optical energy of light signal 112 is reflected from the surface of cornea 118 at a glancing angle (~60 degrees to the normal) onto photodetector module 104 as reflected signal 120. As eye 114 rotates, the intensity of reflected signal 120 changes as a function of the position of a unique point on cornea 118, thereby enabling a system according to aspects of the present disclosure to track position of this point and, as a consequence, the position of the corresponding corneal glint. A plurality of corneal glints may be used to determine the position of the cornea. In some embodiments, the surface area of the photodetector acts as a spatial filter to remove any high frequencies from the far-field pattern projected by the scanner.

Photodetector module 104 includes one or more non-imaging photodetectors configured to detect reflected signal 120 and provide corresponding output signal 122 to processor 106. In one embodiment, the non-imaging photodetector(s) are optoelectronic devices that convert optical signals to electrical signals, such as a photodiode with analog front end and/or transimpedance amplifier or other optoelectronic components for light detection (e.g., an avalanche photodiode, a silicon photomultiplier, a photomultiplier tube, etc.) In some examples, the non-imaging photodetector(s) are discrete detectors, where, for the purposes of this disclosure, including the appended claims, a "discrete detector" is defined as an optoelectronic device (e.g., a photodiode, etc.) having no more than four electrically independent detection regions on a single substrate, where each detection region is operative for providing one electrical signal whose magnitude is based on the intensity of light incident upon that detection region. Examples of discrete detectors include detectors having only one detection region, split detectors having two detection regions, four-quadrant detectors having four detection regions, and position-sensitive detectors. The definition of discrete detector explicitly excludes individual pixels, or groups of pixels, within array devices for collectively providing spatially correlated image information (i.e., imaging detectors), such as focal-plane arrays, image sensors, and the like.

In some embodiments, photodetector module 104 includes multiple non-imaging photodetectors that provide multiple output signals to the processor. Photodetector module 104 can be of any variety known in the art without departing from the scope of the present disclosure.

In one embodiment, photodetector module 104 includes a photodetector for detecting diffuse reflections (e.g., from the pupil, etc.) and a photodetector for detecting specular reflections (e.g., from glints, etc.). Diffuse-reflection photodetectors are typically high-gain, while specular-reflection photodetectors are typically low-gain. In addition, diffuse-reflection photodetectors are typically larger in surface area than specular-reflection photodetectors. In one such embodiment, the diffuse-reflection and specular-reflection photodetectors are different signal branches of the same analog front-end (AFE) circuit using the same photodiode.

It should be noted that in some other embodiments, photodetector module 104 might include only a single photodetector (e.g., one specular-reflection photodetector, and no other photodetectors; one diffuse-reflection photodetector, and no other photodetectors; etc.) rather than a plurality of photodetectors. Such alternative embodiments may have less utility, as they cannot detect all feature types, however they might still be useful in certain applications, and provide some power-reduction capability.

It should further be noted that some embodiments of the present disclosure may employ a photodetector module 104 that includes a plurality of photodetectors of a particular reflection type, potentially to provide redundancy/fault-tolerance, a richer data set for position of the eye, etc. For example, in some embodiments photodetector module 104 might have two diffuse-reflection photodetectors and two specular-reflection photodetectors; or two diffuse-reflection photodetectors and one specular-reflection photodetector; or one diffuse-reflection photodetector and two specular-reflection photodetectors; or three diffuse-reflection photodetectors and two specular-reflection photodetectors; or three diffuse-reflection photodetectors and two specular-reflection photodetectors; and so forth. In still other embodiments, eye-tracking system 100 might comprise a plurality of photodetector modules. For convenience, FIG. 1 depicts a single photodetector module 104.

Processor 106 is a controller/processor configured to drive the components of source module 102 with appropriate drive signals 124, receive output signal 122 from photodetector module 104, generate an estimate of the gaze vector of an eye being monitored with system 100 based on output signal(s) 122, among other functions. As will be appreciated by those skilled in the art, some embodiments of the present disclosure might include a plurality of processors, rather than a single processor. For convenience, FIG. 1 depicts a single processor 106.

In some embodiments, processor 106 includes one or more components containing processing and control circuitry that can include hardware structured to execute functions in accordance with the present disclosure. In some embodiments, such circuitry can include machine-readable media for configuring the hardware to execute functions described herein, including instructions corresponding to the method of FIGS. 5A and 5B described below. Furthermore, the processing circuitry of processor 106 can be embodied as one or more circuitry components including, but not limited to, processing circuitry, network interfaces, peripheral devices, input devices, output devices, sensors, etc. In some embodiments, such processing circuitry can take the form of one or more analog circuits, electronic circuits (e.g., integrated circuits (IC), application-specific integrated-circuits (ASICs), discrete circuits, system on a chip (SOCs) circuits, etc.), telecommunication circuits, hybrid circuits, and any other type of "circuit," or combinations thereof. In this regard, "processing circuitry" can include one or more of any type of component for accomplishing or facilitating achievement of operations in accordance with the present disclosure. For example, a circuit as described herein can include one or more transistors, logic gates (e.g., NAND, AND, NOR, OR, XOR, NOT, XNOR, etc.), resistors, multiplexers, registers, capacitors, inductors, diodes, wiring, and so on).

"Processing circuitry" can also include one or more processors and/or controllers communicably coupled to one or more memory or memory devices. In this regard, the one or more processors can execute instructions stored in the memory or can execute instructions otherwise accessible to the one or more processors. In some embodiments, the one or more processors can be embodied in various ways. The one or more processors can be constructed in a manner sufficient to perform at least the operations described herein. In some embodiments, the one or more processors can be shared by multiple circuits (e.g., circuit A and circuit B can comprise or otherwise share the same processor which, in some example embodiments, can execute instructions stored, or otherwise accessed, via different areas of memory). Alternatively, or additionally, the one or more processors can be structured to perform or otherwise execute certain operations independent of one or more co-processors. In other example embodiments, two or more processors can be coupled via a bus to enable independent, parallel, pipelined, or multi-threaded instruction execution. Each processor can be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors can take the form of a single core processor, multi-core processor (e.g., a dual core processor, triple core processor, quad core processor, etc.), microprocessor, etc. In some embodiments, the one or more processors can be external to the apparatus, for example the one or more processors can be a remote processor (e.g., a cloud-based processor). Alternatively, or additionally, the one or more processors can be internal and/or local to the apparatus. In this regard, a given circuit or components thereof can be disposed locally (e.g., as part of a local server, a local computing system, etc.) or remotely (e.g., as part of a remote server such as a cloud-based server, etc.). To that end, processing circuitry in accordance with the present disclosure can include components that are distributed across one or more locations.

The present disclosure contemplates methods, systems and program products on any machine-readable media for accomplishing various operations. The embodiments of the present disclosure can be implemented using existing computer processors, or by a special purpose computer processor and/or controller for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general-purpose computer, special purpose computer, or special purpose processing machines to perform a certain function or group of functions.

In the depicted example, source module 102 is mounted to temple 126 of eyeglass frame 128, while photodetector module 104 is mounted to the frame 128 near bridge 130. In some embodiments, these positions are reversed and source module 102 is located near bridge 130 and photodetector module 104 is located near, or on, temple 126. As will be appreciated by those skilled in the art, some embodiments of eye-tracking system 100 may include additional elements not depicted in FIG. 1, such as a head tracker comprising an inertial measurement unit [IMU] and inside-out camera, etc.

Figure 2:
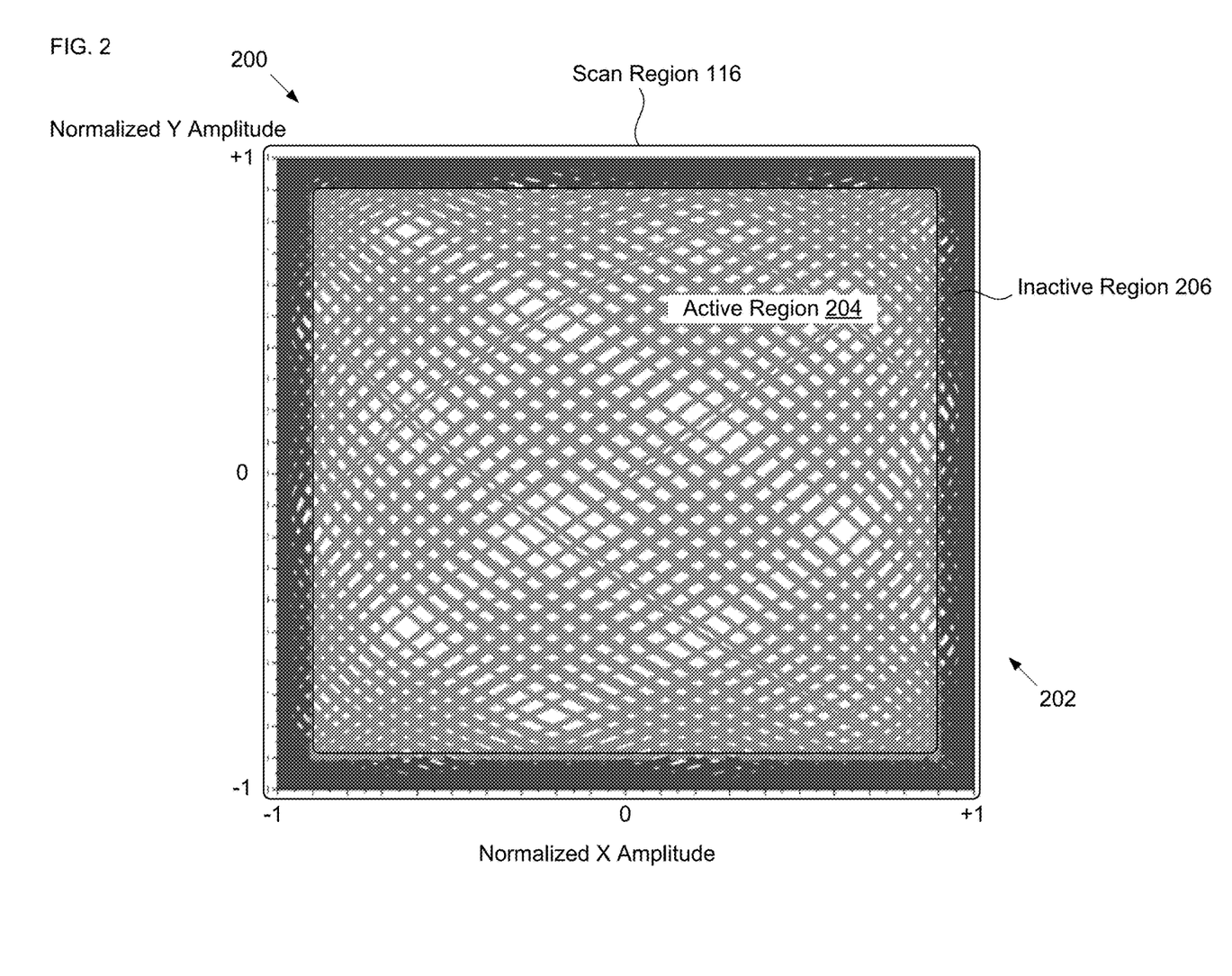
FIG. 2 depicts a plot showing an exemplary two-dimensional interrogation pattern suitable for use in an eye-tracking system in accordance with the present disclosure.

FIG. 2 depicts a plot showing an exemplary two-dimensional interrogation pattern suitable for use in an eye-tracking system in accordance with the present disclosure. Interrogation pattern 200 includes scan pattern 202, active region 204, and inactive region 206.

In the depicted example, scan pattern 202 is a two-dimensional scan path over which light signal 112 would traverse if light source 108 were energized during the entire duration of a scanning interval of the scanner 110 (typically, at least one complete scan period). In other words, scan pattern 202 is a two-dimensional pattern that would enable the light signal to effectively interrogate the entirety of scan region 116. Preferably, scan pattern 200 is a high-density pattern and its scan period is quite short. Scan patterns suitable for use in accordance with the present disclosure are discussed in detail in U.S. Pat. Pub. Nos. 2018/0210547, 2021/0081041, and 2021/0124416, each of which is incorporated herein by reference.

In the depicted example, scan pattern 202 is a Lissajous pattern generated by source module 102 based on drive signals 124, which are provided by processor 106 to the rotation axes of scanner 110. In the depicted example, each axis of scanner 110 is characterized by a resonant frequency and driven with a periodic signal having a drive frequency that is based on that resonant frequency. Those skilled in the art will appreciate that periodic drive signals provided to each axis of scanner 110 gives rise to a scan pattern that is substantially a Lissajous curve (also known as a Lissajous figure), which is the graph of a system of parametric equations defined by $x = A \sin(at+\delta)$; $y = B \sin(bt)$. Furthermore, one skilled in the art will recognize, after reading this Specification, that the shape and density of such a curve is determined primarily by the ratio between these resonant frequencies. In some embodiments, the drive frequencies for one or both axes of scanner 110 are selected to give rise to precession of scan pattern 200, thereby increasing the rate and scan density at which scan region 116 is interrogated.

It is an aspect of the present disclosure that significant power savings can be accrued by disabling photodetector module 104 and/or light source 108 during at least some portion of the scan period of scan pattern 202, thereby separating scan region 116 into active region 204, whose points are interrogated by light signal 112, and inactive region 206, whose points are not interrogated by light signal 112. For the purposes of this Specification, including the appended claims, the term "active region" is defined as a region of scan region 116 whose (x,y) points are interrogated by light signal 112. In similar fashion, the term "inactive region" is defined as a region of scan region 116 whose (x,y) points are not interrogated by light signal 112.

In the depicted example, active region 204 is surrounded by inactive region 206, which is located at the periphery of scan region 116.

Typically, for a well-centered scan pattern centered on the cornea at straight ahead gaze, for example, the inactive region 206 is unlikely to contain features of the eye (e.g., the pupil, a glint, etc.) that are of interest. However, light signal 112 is directed at points in the inactive region for a significant portion of the scan period. As a result, much of each scan period yields little or no useful information.

In some embodiments, active region 204 and inactive region 206 may be determined via estimates of the likelihood with which a given region contains at least one feature of interest. In some such embodiments, these estimates may be based on geometric modeling of a model eye and geometric arrangement of the sensing system (scanner and detector positions) and/or machine learning using historical or model-generated training data.

It is an aspect of the present disclosure that, by disabling light source 108 and photodetector module 104 while the scanner is scanning inactive region 206, significant electrical power savings can be realized while still collecting substantially the same information about the scan region. In addition, fewer spurious signals and incoming data is provided to processor 106, less computation is needed to discard the spurious data, allowing longer sleep cycles and additional power savings.

The location of the beam at a given point in time, t, of the scan pattern which light signal 112 is directed toward points in full region 206 can be determined mathematically as:

$$F(x(t),y(t))=(A_x*\sin(2\pi*f_x*t-\varphi_x),A_y*\sin(2\pi*f_y*t-\varphi_y)), \quad (1)$$

where $A_x$ is the drive signal amplitude in the x axis, $f_x$ is the frequency of the x axis, $\varphi_x$ is the phase offset of the x axis, $A_y$ is the drive signal amplitude in the y axis, $f_y$ is the frequency of the y axis, and $\varphi_y$ is the phase offset of the y axis.

Table 1 below provides exemplary values for the percentage of a scan period during which light signal 112 interrogates points in inactive region 206 for inactive regions containing different percentages of the area of scan region 116. The values provided in Table 1 are generated using Equation (1) above for a scan region having 100,000 uniformly spaced (x,y) points and for a scan period of 30 milliseconds.

TABLE 1

Representative scan-period percentages spent interrogating inactive region 206.

| Percentage of a Spatial Scan Region Included in an Inactive region | Percentage of Scan Time Spent in the Inactive region |
| --- | --- |
| 1% | 12.3% |
| 5% | 26.7% |
| 8% | 33.2% |
| 10% | 36.8% |
| 15% | 44.2% |

Table 1 shows that, for an inactive region 206 occupying only 10% of the area of scan region 116, a typical Lissajous scan pattern for light signal 112 spends approximately half of its scan period directed at points in the inactive region. As a result, disabling photodetector module 104 and light source 108 during that time period could realize nearly 50% power savings while losing a relatively small fraction (10%) of the total scan area.

Embodiments in accordance with the present disclosure realize an additional benefit by limiting interrogation to only those points in active region 204 because the trajectory of light signal 112 is most linear when directed at the active region. As a result, shape of the detector pulse has a substantially consistent size across all of the (x,y) points in active region 204, which facilitates signal-chain optimization and filter design.

It should be noted that, although active region 204 is centered within scan region 116 in the depicted example, the area interrogated with light signal 112 does not need to be centered and can allow for increased off-time of the photodetector module and light source.

Figure 3:
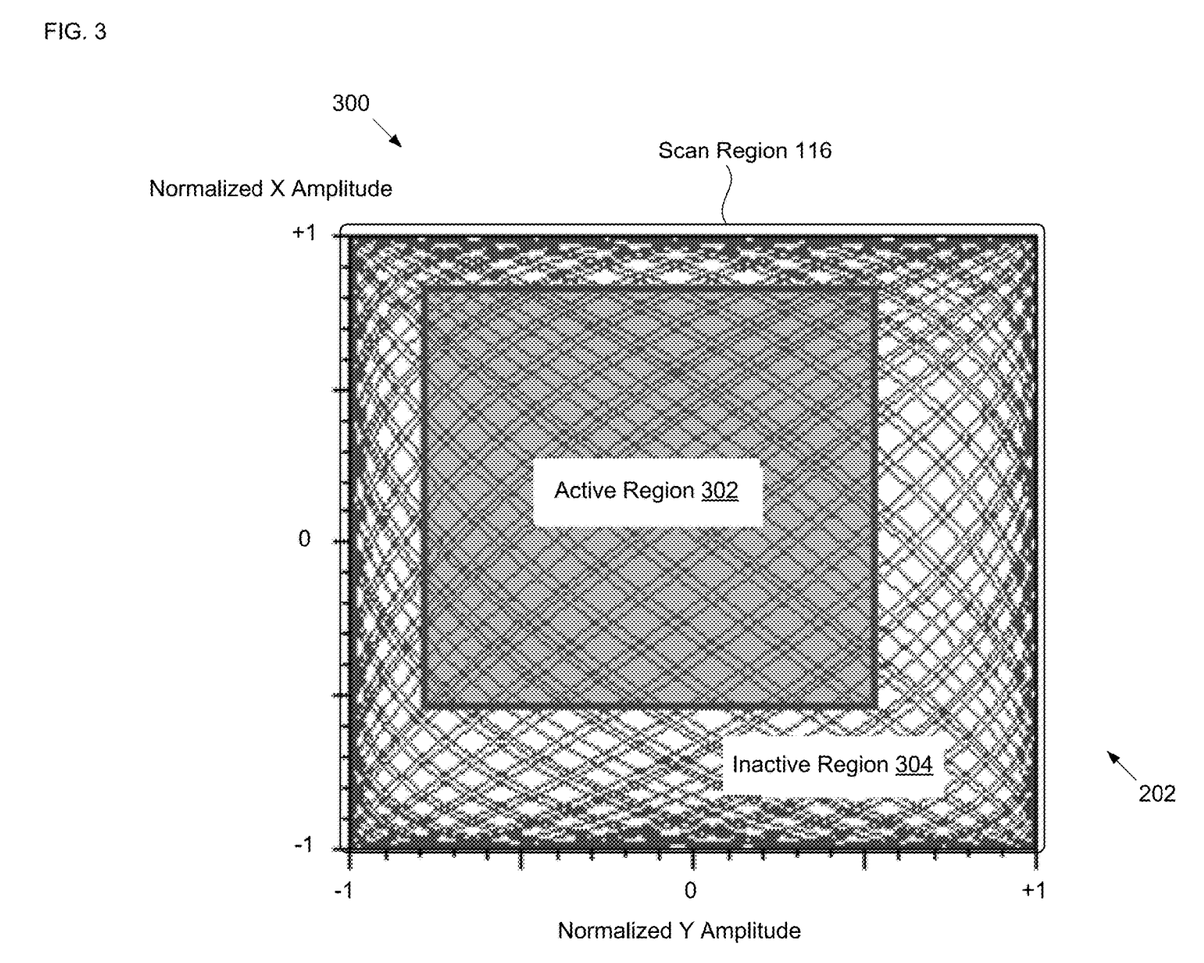
FIG. 3 depicts a plot showing another exemplary two-dimensional interrogation pattern suitable for use in an eye-tracking system in accordance with the present disclosure.

FIG. 3 depicts a plot showing another exemplary two-dimensional interrogation pattern suitable for use in an eye-tracking system in accordance with the present disclosure. Interrogation pattern 300 is analogous to interrogation pattern 200; however, interrogation pattern 300 is offset from the center of scan region 116 to give rise to active region 302 and inactive region 304.

The ability to customize the position and/or size of active region 302 within scan region 116 affords embodiments in accordance with the present disclosure significant advantages over the prior art. For example, an eye-tracking system design can be developed to accommodate the majority of the world's population; however, individual eye-tracking systems of such a design can be easily customized for a particular user or set of users. As a result, the significant costs associated with producing and inventorying a variety of eye-tracking system designs is avoided; however, a unit can be tailored to one user merely by activating the transmit and receive circuitry in the possible locations for that individual.

In some embodiments, multiple light sources, sensors, photodetectors, and/or detector modules are used to enable sensor fusion that can provide more robust estimation of one or more parameters, such as gaze direction, redundancy, and/or subsystem backup. The inclusion of multiple light sources and/or multiple photodetectors also enables accommodation of different people with different inter-pupil distances (IPD). Unfortunately, the use of multiple light sources and/or photodetectors increases power consumption and, in some cases, does not provide significantly improved system performance. For example, when an eye is looking along a direction toward the top-right of a scene, the light source(s) or the photodetector(s) in the lower left of the system can be nearly completely ineffective. Systems as taught herein, however, can improve power consumption in such systems by disabling system elements that are unused or out of the area of interest.

Embodiments of the present disclosure utilize a variety of techniques for reducing the amount of power consumed by eye-tracking systems (e.g., eye-tracking system 100, etc.). One such technique is the disabling of one or more elements of the eye-tracking system (e.g., light source(s), photodetector(s), etc.) that are not required for the particular output of interest. More particularly, because duty-cycling of elements typically does not significantly impair overall system performance, it is practical to disable components and then re-enable them only when they are needed for their prescribed purpose. For example, in an eye-tracking system in which pupil position is used as the main source of information for the gaze vector, a detector for detecting a glint may be disabled, thereby reducing power consumption. In one example, the eye-tracking system may subsequently enable glint detectors on a regular basis in order to solve for the corneal position in 3D and thereby check for eyeglass frame slip on a user's head or to perform some other validation function.

In accordance with a second technique, an eye-tracking system can be configured to sample and provide an output signal at a lower rate by disabling all sensing and emitting elements, and subsequently enabling them when an output signal is expected. For example, if an eye-tracking system is configured to output at 60 Hz, and the systems requires a 10-millisecond window of pupil and glint data to output the gaze, then system elements such as the scanner, photodetector(s), light source(s), and even the processing unit only need to be enabled for 600 milliseconds for every second, and thus can be disabled during the remainder of each cycle.

In accordance with a third technique, the eye-tracking system detects events (e.g., when the user's eye is stationary, etc.), and in response, the system (1) contracts the scan region down to a smaller active subregion containing a single feature (e.g., the pupil, a single glint, etc.), and (2) disables all irrelevant photodetectors (i.e., photodetector(s) that are not needed for detecting/monitoring the single feature). For example, if the single feature is the pupil, then any specular-reflection photodetectors in the system can be disabled, as these photodetectors are not configured to detect the pupil.

In response to detecting a particular type of event of interest (e.g., a change in a characteristic of the single feature, a change in position of the single feature, a change in detectability of the single feature ["disappearance" or "appearance"], a lack of change in feature characteristics/position/detectability, etc.), the eye-tracking may re-enable elements in order to fully capture the new eye state or motion. The primary benefit of focusing on a single feature is that the scan region required to locate a single feature is far smaller than the span to cover multiple features. In some embodiments, particular types of events may be detected via an auxiliary detection mechanism, such as an optical flow sensor, an electrooculogram, or some other detection mechanism with sufficiently low power to reduce overall power consumption.

Figure 4:
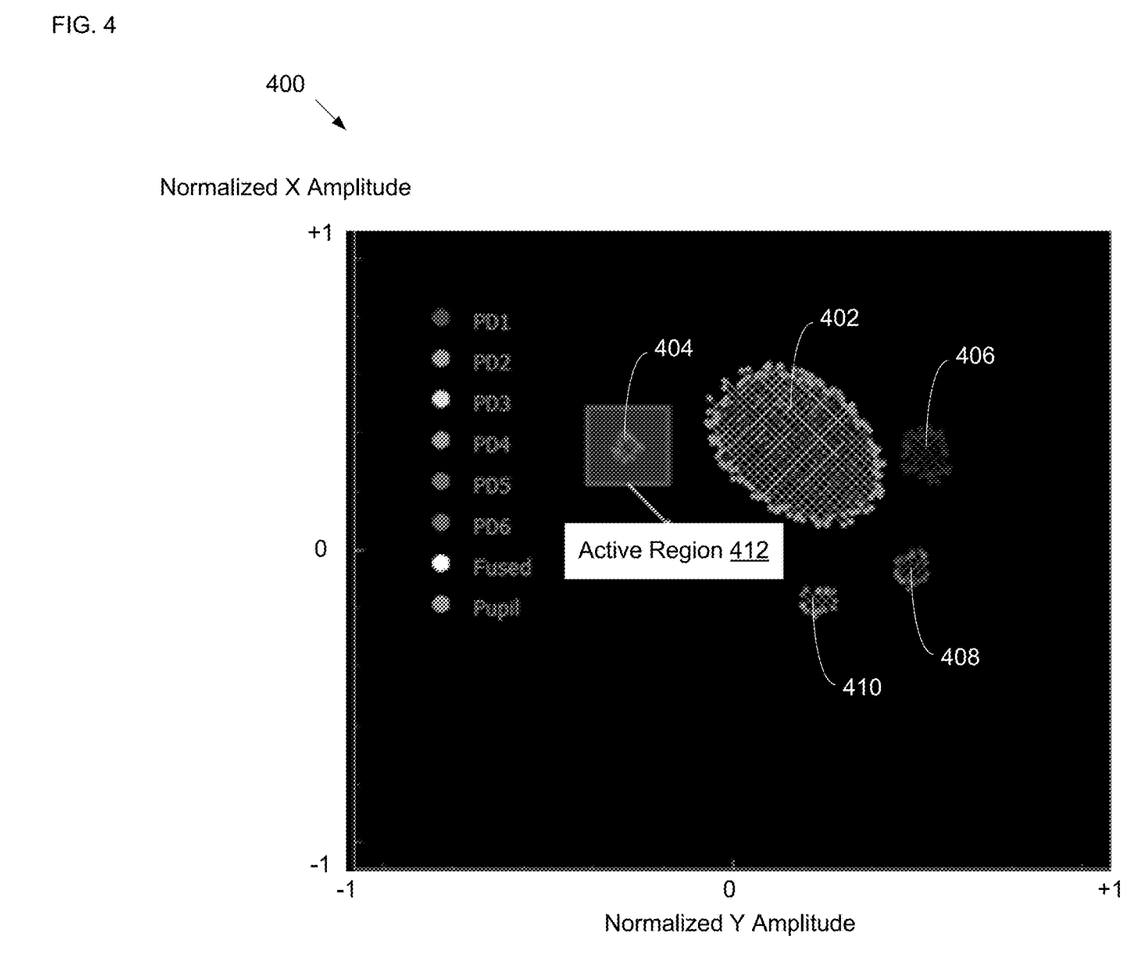
FIG. 4 depicts a plot containing a plurality of features of an eye that are obtained using an eye-tracking system in accordance with the present disclosure.

As noted above, one way to detect an event is to monitor and actively sense only a single feature, thereby ignoring the remaining features until the event has been detected. FIG. 4 depicts a plot containing a plurality of features obtained using an eye-tracker in accordance with the present disclosure. Plot 400 includes features 404, 406, 408, and 410, each of which represents a detected glint from eye 114 while feature 402 represents a pupil.

Feature 402 corresponds to the pupil of eye 114, while each of features 404-410 corresponds to a respective glint received from the eye by detector module 104. As will be appreciated by one skilled in the art, gaze direction of an eye can be determined by tracking the position of its pupil. As another example, a change in alignment between the eye-tracking system and the eye (e.g., due to slippage of eyeglass frame 128, etc.) can be detected via detection/monitoring of one or more glints, and optionally the pupil as well. In particular, glints locate the cornea, and the combination of cornea and pupil sets the optic axis of the eye. Calibration of the eye tracking system determines offset of optic axis and visual axis as well as geometric parameters such as offset of the cornea center with respect to the eyeball center, corneal radius, eye radius and so-on based on the fidelity of the model. If the eyeball center changes in position relative to eyeglass frame 128, then a change in alignment has occurred.

In plot 400, active region 412 is established such that it includes only feature 404, in order to enable, for example, monitoring of eyeglass-frame slippage. If, during operation, feature 402 is no longer detected or has shifted within the region by an amount that exceeds a threshold, active region 412 can be enlarged as much as desired, even encompassing the entirety of scan region 116, to more fully capture the state of the scan region.

Embodiments of the present disclosure utilize a variety of concepts that have been developed by the inventors. One such concept is an eye event. An eye event is defined as an event associated with the user's eye, such as a change in gaze direction, a change in alignment between the user's eye and the eye-tracking system, a blink, a closing of the eye for at least a specified time duration, a partial closing of the eye, saccade, fixation, stationary eye, vestibulo-ocular reflex (VOR), and so forth. As will be appreciated by those skilled in the art, detection of eye events may be useful for a variety of purposes, including gleaning information about the user and potentially inferring a particular state or condition of the user. For example, dilation of the pupil may indicate arousal, while blinking more often than a baseline frequency might indicate fatigue. The latter example might be especially useful for monitoring the alertness of a user driving a vehicle.

A feature event is defined as an event associated with a particular feature of a user's eye (e.g., pupil, glint, etc.), such as: a change in a characteristic of the feature (e.g., size, shape, etc.), possibly by an amount exceeding a specified threshold; a change in the position of the feature, possibly by an amount exceeding a specified threshold; movement of the feature with a speed exceeding a specified threshold; a change in detectability of the feature (e.g., "disappearance" of a feature [i.e., the feature is no longer detected], "appearance" of a feature [i.e., the feature is newly detected], etc.); a lack of change in feature characteristic(s) and/or feature position and/or feature detectability for a duration of time exceeding a threshold (e.g., stationary eye, etc.); and so forth.

An occurrence of a particular type of feature event or a particular type of set/sequence of feature events may suggest (or in some cases definitively indicate) an occurrence of a particular type of eye event. For example, movement of the pupil indicates a change in gaze direction. As another example, (1) a pupil disappearing and then re-appearing within a time duration threshold, and (2) at the same time, a sequential disappearance of glints, suggests that a blink may have occurred. It should be noted that the relationship between feature events and eye events may be one-to-one, many-to-one, or one-to-many.

An external event is defined as an event that is not associated with a user's eye, such as a change in ambient light (e.g., an indoor light is turned on or off, a user moves from indoors to outdoors, a seated user stands up, etc.). As will be appreciated by those skilled in the art, an external event can cause a feature event and/or an eye event (e.g., a change in ambient lighting can cause dilation of the pupil, and/or a blink; a seated user standing up can cause feature changes as a result, for example, of eyeglass-frame slippage; etc.).

Embodiments of the present disclosure are based on the inventors' recognition that certain eye events can be detected by monitoring a single feature of the eye, and on the inventors' recognition that the use of single-feature monitoring can reduce power consumption. In accordance with one embodiment, single-feature monitoring is performed by first determining a type of eye event that is of interest; then determining a type of feature to monitor based on the type of eye event; and then, if there are a plurality of features of the determined type (e.g., a plurality of glints, etc.), selecting one of the features. It should be noted that in some cases, it might be desirable to monitor multiple features (e.g., monitoring all of the glints to track the cornea, etc.), as is described in detail below with respect to the method of FIGS. 5A and 5B.

In one embodiment, determining that a particular type of eye event is of interest may be in response to a "triggering" event, which might be a prior eye event, an external event, or so forth. As an example, in response to detecting stationary eye, the eye-tracking system might then monitor the pupil for movement to determine that the eye is no longer stationary.

In accordance with one embodiment, after the type of feature has been determined, photodetector(s) that are incapable of detecting that type of feature are disabled. For example, if the type of feature is "pupil," then specular-reflection photodetector(s) can be disabled, thereby saving power, with no compromise in the system's ability to perform eye tracking.

In one embodiment, selection of a particular feature from a plurality of candidate features may be based on one or more characteristics of the features (e.g., size, shape, etc.), and/or the positions of the features. Feature selection is described in more detail below with respect to the method of FIGS. 5A and 5B.

In accordance with one embodiment, additional power savings can be realized via contraction of the scan region. In one implementation, two stages of contraction can be employed: first, the scan region is contracted to a first subregion that still contains all of the features. In one example, the first subregion is a bounding rectangle, ideally of minimum size. Subsequently, after a feature has been selected, the first subregion is contracted to a second subregion that includes only the selected feature (e.g., a smaller rectangle within the first subregion, etc.). Power consumption is then reduced by disabling enabled light source(s) and photodetector(s) when scanning outside of the second subregion (i.e., when scanning inactive region(s)). Scan region contraction is described in more detail below with respect to the method of FIGS. 5A and 5B. As will be appreciated by those skilled in the art, some implementations of the present disclosure might employ subregions with a shape other than a rectangle (e.g., a hull, a polygon other than a rectangle, an ellipse, a circle, etc.).

In accordance with one embodiment, the second subregion is continually scanned until a feature event of the determined type is detected. In response to this detection, the second subregion is expanded, and this expanded region is scanned (e.g., to detect a subsequent event, etc.). In some examples, the expanded second subregion might be the same as the first subregion, while in some examples the expanded second subregion might be different than the first subregion (e.g., an updated bounding rectangle, due to movement of one or more features; a different shape, etc.). Scan region expansion is described in more detail below with respect to the method of FIGS. 5A and 5B.

Figure 5A:
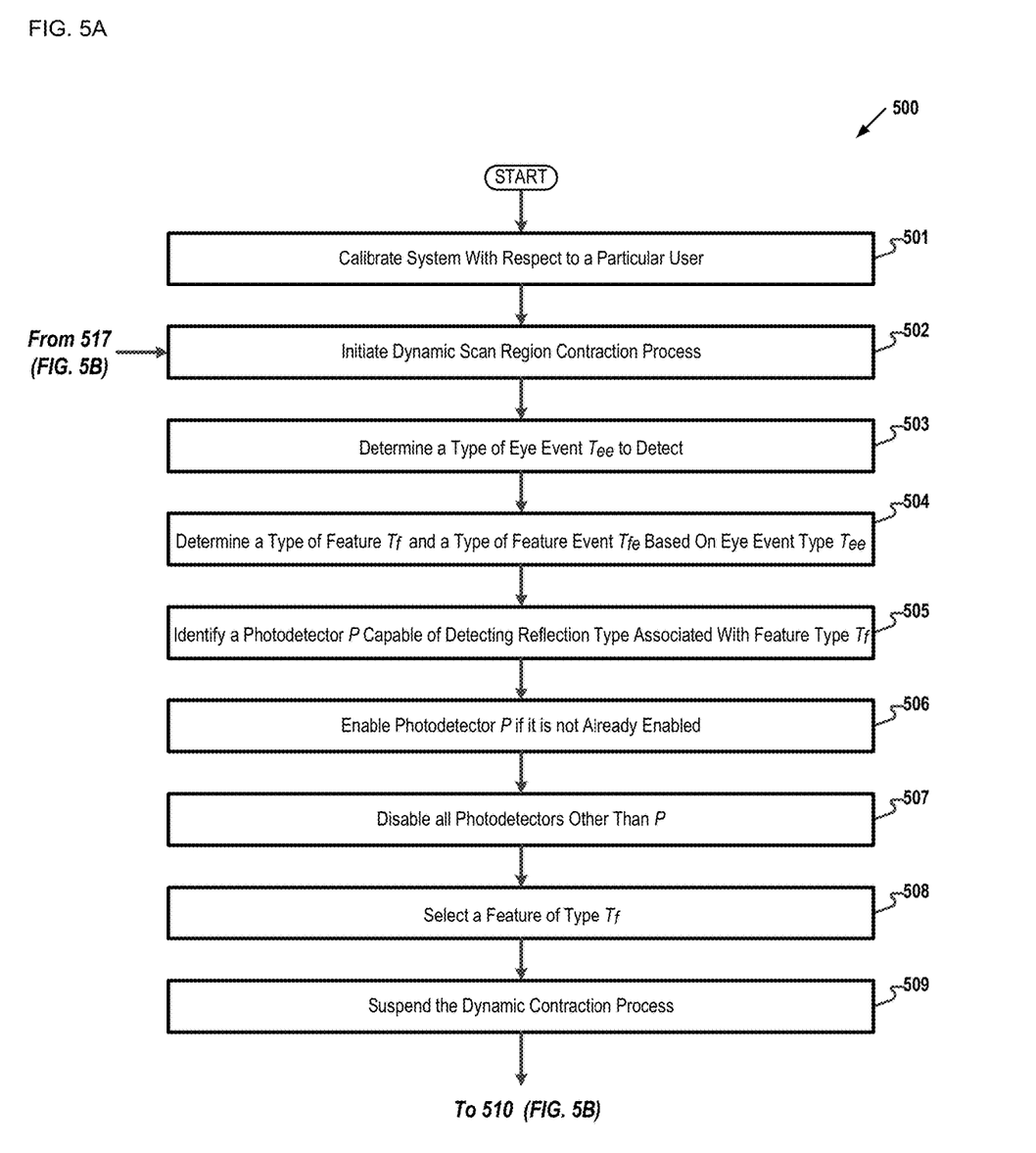
FIGS. 5A and 5B depict a flow diagram of aspects of a method of eye tracking, in accordance with one embodiment of the present disclosure.
Figure 5B:
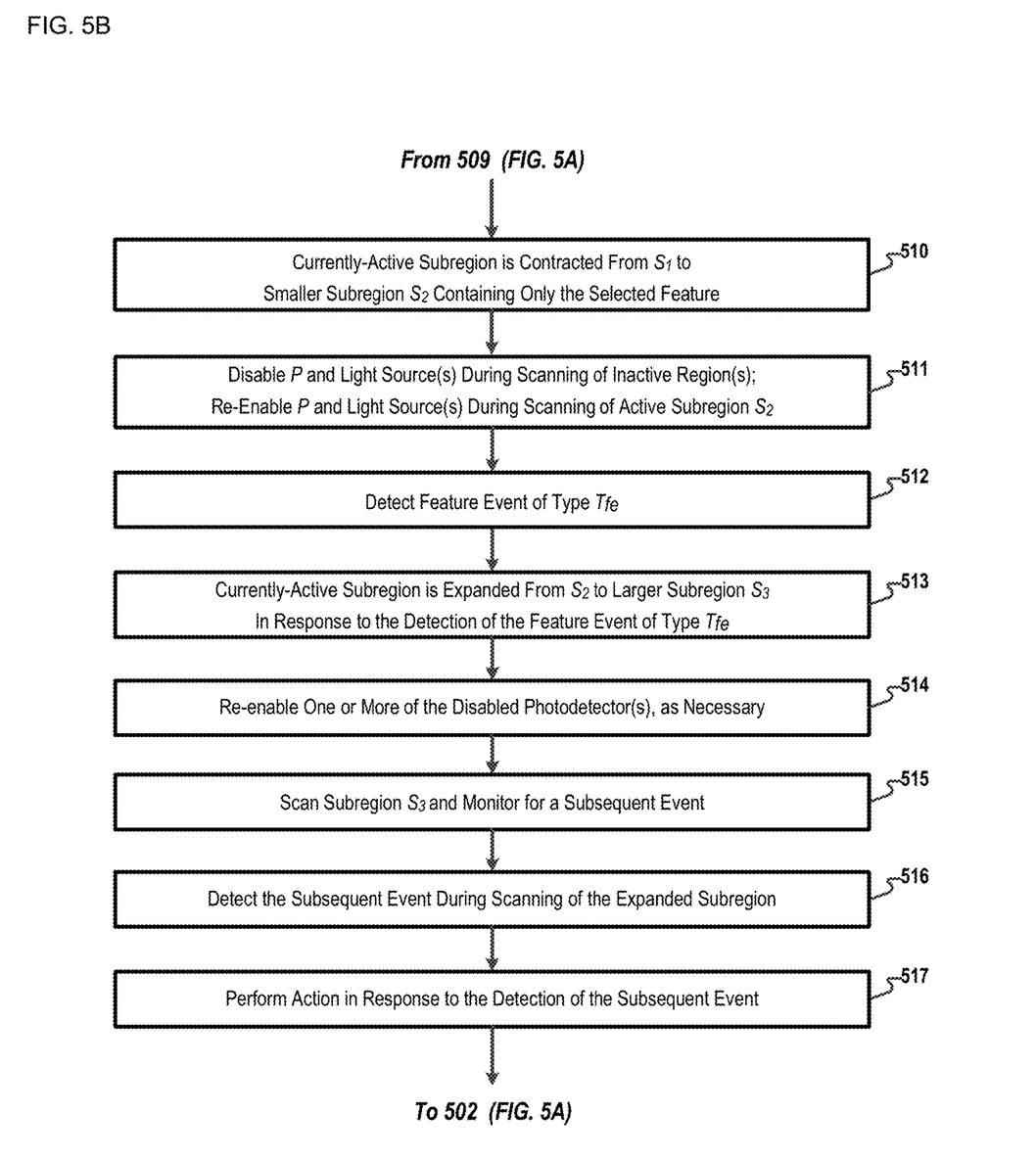

FIGS. 5A and 5B depict a flow diagram of aspects of a method 500 of eye tracking, in accordance with one embodiment of the present disclosure. The method reduces power consumption compared to methods of the prior art. In one example, the method is performed by processor 106 of eye-tracking system 100. It should be noted that in some alternative embodiments, one or more blocks depicted in FIGS. 5A and 5B might be performed concurrently, or in a different order than that depicted.

At block 501, eye-tracking system 100 is calibrated with respect to a particular user. In one embodiment, the calibration procedure comprises imaging an entire scan, which can be used to determine initial eye origin and fit. This information provides a baseline position and gaze orientation for the particular user, enabling the system to adjust to and compensate for user-to-user variations. In one embodiment, the initial scan may also include an iris image that can be used to identify the user, select the prescribed calibration, and establish the size of the scan region.

At block 502, a dynamic scan region contraction process is initiated. The process executes concurrently with scanning of the scan region. In one implementation, execution of the process is also concurrent with the execution of blocks 503 through 518, described below. The process operates by continually and dynamically determining an active subregion that is smaller than the scan region while still containing all features that are currently present (e.g., a bounding box containing the pupil and glints, [ideally of minimum size], etc.). The active subregion is updated as necessary in response to changes in feature positions/characteristics/detectability. During this process, all enabled light sources and all enabled photodetectors are disabled during scanning of inactive subregions, and re-enabled during scanning of the active subregion. In one such implementation, the disabling/re-enabling of the photodetectors is performed via transmission of one or more signals from processor 106 to the photodetectors of photodetector module 104, and similarly, via transmission of one or more signals from processor 106 to light source(s) 108. In one example, during the scan of an inactive scan region, processor 106 may toggle a control line to the analog front end accompanying the photodiode which comprises the photodetector to enter a low power state. Simultaneous to the detector entering low power standby, or shortly before or after entering low power standby, the light source(s) may also be disabled through a switch or some other enable mechanism. As will be appreciated by those skilled in the art, the relative timing of the light source enable signal before or after the low power standby signal of the analog frontend may be determined based on setup and hold requirements of the analog front-end's standby signals.

At block 503, a type of eye event or set/sequence of eye events to detect (e.g., a blink, a change in gaze direction, etc.) is determined. In some examples, block 503 may be performed in response to a triggering event (e.g., an external event, a prior eye event such as stationary eye, etc.). We subsequently refer to the determined type of eye event (or set/sequence of eye events, as appropriate) as $T_{ee}$.

At block 504, a type of feature $T_f$ and a type of feature event $T_{fe}$ are determined based on the eye event type $T_{ee}$. For example, when eye event type $T_{ee}$ is "change in gaze direction", feature type $T_f$ might be type "pupil", and feature event type $T_{fe}$ might be "change in position of at least N microns", where N is a positive real number. In one implementation, associations between eye event types, feature types, and feature event types are established a priori, and determinations of feature type and feature event type are performed by a simple lookup.

It should be noted that in some examples, an event might involve a plurality of feature types, rather than one (e.g., an eye event involving both the pupil and glint(s), etc.). In embodiments where such situations are possible, the present method may be implemented such that $T_f$ is a set of feature types, either singleton or non-singleton, and it will be clear to those skilled in the art, after reading this disclosure, how to modify the present method accordingly. For convenience, the remainder of the method is described in the context of a single feature type $T_f$.

At block 505, a photodetector P capable of detecting the reflection type associated with feature type $T_f$ is identified (e.g., a photodetector capable of detecting diffuse reflections when the feature is a pupil, a photodetector capable of detecting specular reflections when the feature is a glint, a photodetector which can be configured for such purpose by configuration word, etc.) As noted above, in some embodiments, eye-tracking system 100 might include a plurality of photodetectors for a given reflection type, in which case one of these photodetectors is selected.

At block 506, photodetector P is enabled, if it is not already enabled (e.g., if it was disabled, and left disabled, during a prior execution of the method; etc.).

At block 507, all photodetectors other than P are disabled.

At block 508, a feature of type $T_f$ is selected. In one implementation, when there are a plurality of features of type $T_f$, a feature is selected from the plurality of candidates in an intelligent manner, rather than arbitrarily. In one example, a feature is selected based on one or both of (1) the sizes of the candidate features, and (2) the likelihood with which each of the candidate features changes with eye movement (e.g., a change in a feature characteristic such as size or shape, a change in position, etc.). In one such example, an ideal feature is one that is smallest and is most likely to change with eye movement. As will be appreciated by those skilled in the art, when there is no such ideal feature, a weighted average between size and likelihood of change might be employed for selection. In some such examples, the weights of the average might be determined a priori (e.g., via modeling, machine learning, etc.).

As another example, feature selection might be based on one or more criteria (e.g., gaze direction, etc.), either in addition to, or instead of, feature size and/or likelihood of changing with eye movement. In some such examples, methodologies such as modeling, machine learning, etc. might be used to determine the particular criteria upon which feature selection is based, and possibly the weightings of various criteria as well.

At block 509, the dynamic contraction process initiated at block 502 is suspended.

At block 510, the currently-active subregion is further contracted from the subregion established by the dynamic process of block 502, which we refer to as subregion $S_1$, to a smaller active subregion $S_2$ containing only the selected feature. Similar to the dynamic contraction process initiated at block 502, the contraction to subregion $S_2$ is performed via disabling/re-enabling of the photodetectors. In one implementation, the disabling/re-enabling is accomplished via transmission of one or more signals from processor 106 to the photodetectors of photodetector module 104, and similarly, via transmission of one or more signals from processor 106 to light source(s) 108.

It should be noted that in some alternative embodiments, the contraction at block 510 might be performed such that subregion $S_2$ contains a plurality of features, rather than a single feature. For example, if feature type $T_f$ is "glint", and there are three glints in subregion $S_1$, then the currently-active subregion might be contracted from $S_1$ to $S_2$ such that $S_2$ contains two of the three glints. As another example, when feature type $T_f$ is "glint", it might be desirable to contract the currently-active subregion from $S_1$ to $S_2$ such that subregion $S_2$ contains all of the glints (e.g., in order to track the cornea, etc.). As yet another example, when feature type $T_f$ is a non-singleton set containing types "pupil" and "glint", it still might be desirable to contract the currently-active subregion from $S_1$ to $S_2$ such that subregion $S_2$ still contains the pupil and all of the glints, but removes the remaining background of the scan region, thereby enabling faster response in detecting particular events (e.g., monitoring the eye center to detect eyeglass-frame slippage, etc.). In some implementations, the plurality of features contained in subregion $S_2$, or a subset thereof containing at least two of the features, might be selected at block 508, rather than selection of a single feature at block 508. Naturally, contraction to a plurality of features, rather than to a single feature, may provide less power savings, and thus it may be desirable, when possible, to contract the active subregion to contain a single feature.

It should further be noted that in some alternative embodiments, the contraction at block 510 might be performed such that subregion $S_2$ contains a portion of the selected feature, rather than the entire feature.

At block 511, the scan region is continually scanned, during which photodetector P and all light sources are disabled during scanning of the inactive regions (i.e., regions other than subregion $S_2$), and are re-enabled during scanning of subregion $S_2$. In one implementation, the disabling/re-enabling is performed via signals transmitted from processor 106 to photodetector module 104, as in the (currently suspended) dynamic process of block 502.

At block 512, a feature event of type $T_{fe}$ is detected during the continual scanning performed at block 511. At block 513, in response to the detection at block 512, the currently-active subregion expands from $S_2$ to a larger subregion $S_3$. In some examples, subregion $S_3$ might be the same as subregion $S_1$, possibly adjusted as necessary for any changes in feature detectability/position/characteristics, while in some other examples, subregion $S_3$ might be the entire scan region. In still other examples, subregion $S_3$ might be an "intermediate" subregion (e.g., a subregion larger than $S_2$ but smaller than $S_1$; a subregion larger than $S_1$ but smaller than the entire scan region, etc.).

In one embodiment, the degree of expansion (i.e., the size of the expanded region) and/or the position of the expanded subregion may be determined based on one or more of the following: the type of subsequent event to detect (e.g., eyeglass slippage, etc.); a particular state of interest to monitor (e.g., stationary eye, gaze direction, etc.); a particular feature characteristic of interest to monitor (e.g., pupil size, etc.); an update rate associated with the type of subsequent event to detect, which quantifies how soon the system needs to look for that type of event; the current state of the single feature (e.g., the current pupil size, the current shape of a glint, etc.).

At block 514, one or more of the disabled photodetector(s) may be re-enabled. In some implementations, all of the disabled photodetectors may be re-enabled automatically, while in some other implementations, the re-enabling may be based on the particular type of subsequent event of interest, such that in some cases, a subset of disabled photodetectors may be re-enabled selectively, while in some other cases, none of the disabled photodetectors may require re-enabling.

At block 515, subregion $S_3$ is continually scanned and optionally translated to track the active features in order to monitor for a subsequent event, such as a fixation, indicating the opportunity to reduce the size of the active region.

At block 516, a subsequent event is detected during the monitoring performed at block 515. At block 517, an action is performed in response to the detection of the subsequent event (e.g., contraction of the current-actively subregion, further expansion of the current-actively subregion, etc.). After block 517 is performed, execution of the method iterates back to block 502.

It should be noted that in some embodiments, a plurality of features may be selected at block 508, rather than a single feature. In order to facilitate understanding of the present method, as well as for convenience, we use the singular (e.g., "the selected feature") rather than the plural (e.g., "the selected one or more features"). It will be clear to those skilled in the art, after reading this disclosure, how to implement the present method to accommodate selection of a plurality of features.

It is to be understood that the disclosure teaches just some exemplary embodiments and that many variations of the invention can easily be devised by those skilled in the art after reading this disclosure and that the scope of the present invention is to be determined by the following claims.

What is claimed is:

1. An apparatus comprising:
   a light source to generate a light signal;
   a scanner to steer the light signal in a two-dimensional scan pattern that defines a scan region of an eye of a user;
   a non-imaging photodetector to generate one or more output signals based on one or more reflected signals from the scan region; and
   a processing system to:
     select one or more features of the eye based on a specified type of eye event to detect;
     determine a subregion of the scan region that contains at least a portion of each of the one or more selected features;
     transmit one or more signals to (1) disable at least one of the non-imaging photodetector or the light source while scanning portions of the scan region outside of the subregion, and (2) enable the non-imaging photodetector and the light source while the scanner scans the subregion;
     detect, during scanning of the subregion, at least one of: a change in a characteristic of at least one of the one or more selected features, a change in position of at least one of the one or more selected features, or a change in detectability of at least one of the one or more selected features;
     determine, in response to the detection, an expanded subregion that is larger than the subregion; and
     monitor the expanded subregion for a subsequent event.

2. The apparatus of claim 1 wherein at least one of the one or more selected features is a pupil or a glint.

3. The apparatus of claim 1 wherein the type of eye event is a change in gaze direction.

4. The apparatus of claim 1 wherein the type of eye event is a change in gaze direction exceeding a threshold amount.

5. The apparatus of claim 1 wherein the type of eye event is a blink.

6. The apparatus of claim 1 wherein the type of eye event is stationary eye.

7. The apparatus of claim 1 wherein the characteristic is one of size or shape.

8. The apparatus of claim 1 wherein the type of eye event to detect is determined based on an occurrence of a prior event.

9. The apparatus of claim 8 wherein the prior event is one of a prior eye event or an external event.

10. The apparatus of claim 1 wherein the subregion contains the entire feature.

11. The apparatus of claim 10 wherein the subregion does not contain any other features of the eye.

12. An apparatus comprising:
    a light source to generate a light signal;
    a scanner to steer the light signal in a two-dimensional scan pattern that defines a scan region of an eye of a user;
    a first non-imaging photodetector to generate one or more output signals based on one or more diffuse-reflection signals from the scan region;
    a second non-imaging photodetector to generate one or more output signals based on one or more specular-reflection signals from the scan region; and
    a processing system to:
      transmit one or more signals to the second non-imaging photodetector to disable the second non-imaging photodetector during scanning of at least a portion of the pupil of the eye; and
      transmit one or more signals to the first non-imaging photodetector to disable the first non-imaging photodetector during scanning of at least a portion of a glint of the eye;
      wherein the first non-imaging photodetector is enabled during at least a portion of the pupil scanning; and
      wherein the second non-imaging photodetector is enabled during at least a portion of the glint scanning.

13. The apparatus of claim 12 wherein the processing system is further to determine a subregion of the scan region that contains the pupil and does not contain the glint.

14. The apparatus of claim 13 wherein the processing system is further to determine an expanded subregion that is larger than the subregion, wherein the determining of the expanded subregion is in response to detecting at least one of: a change in a characteristic of the pupil, a change in position of the pupil, or a change in detectability of the pupil.

15. The apparatus of claim 12 wherein the processing system is further to determine a subregion of the scan region that contains the glint and does not contain the pupil.

16. The apparatus of claim 15 wherein the processing system is further to determine an expanded subregion that is larger than the subregion, wherein the determining of the expanded subregion is in response to detecting at least one of: a change in a characteristic of the glint, a change in position of the glint, or a change in detectability of the glint.

17. An apparatus comprising:
a light source to generate a light signal;
a scanner to steer the light signal in a two-dimensional scan pattern that defines a scan region of an eye of a user;
a non-imaging photodetector to generate one or more output signals based on one or more reflected signals from the scan region; and
a processing system to:
  select one or more features of the eye based on a specified type of eye event to detect;
  determine a subregion of the scan region that contains at least a portion of each of the one or more selected features;
  transmit one or more signals to (1) disable at least one of the non-imaging photodetector or the light source while scanning portions of the scan region outside of the subregion, and (2) enable the non-imaging photodetector and the light source while the scanner scans the subregion;
  detect, during scanning of the subregion, a lack of change in the one or more selected features, a lack of change in position of the one or more selected features, and a lack of change in detectability of the one or more selected features, for a duration of time exceeding a time duration threshold;
  determine, in response to the detection, an expanded subregion that is larger than the subregion; and
  monitor the expanded subregion for a subsequent event.

18. The apparatus of claim 17 wherein the lack of change in position is with respect to a threshold.

19. The apparatus of claim 17 wherein the lack of change in the one or more selected features is with respect to size and shape.

20. The apparatus of claim 19 wherein the lack of change in the one or more selected features is also with respect to a threshold.

21. An apparatus comprising:
a light source to generate a light signal;
a scanner to steer the light signal in a two-dimensional scan pattern that defines a scan region of an eye of a user;
a first non-imaging photodetector to generate one or more output signals based on one or more reflected signals from a first feature of the eye within the scan region;
a second non-imaging photodetector to generate one or more output signals based on one or more reflected signals from a second feature of the eye within the scan region;
a processing system to transmit one or more signals to the second non-imaging photodetector to disable the second non-imaging photodetector during scanning of at least a portion of the first feature.

22. The apparatus of claim 21 wherein the processing system is further to transmit one or more signals to the first non-imaging photodetector to disable the first non-imaging photodetector during scanning of at least a portion of the second feature.

* * * * *